United States Patent
Yasukawa

(10) Patent No.: US 9,018,920 B2
(45) Date of Patent: Apr. 28, 2015

(54) INFORMATION PROCESSING APPARATUS, AND CONTROL METHOD AND STORAGE MEDIUM THEREFOR

(75) Inventor: Takuma Yasukawa, Yokohama (JP)

(73) Assignee: Canon Kabushiki Kaisha (JP)

( * ) Notice: Subject to any disclaimer, the term of this patent is extended or adjusted under 35 U.S.C. 154(b) by 491 days.

(21) Appl. No.: 13/251,537

(22) Filed: Oct. 3, 2011

(65) Prior Publication Data

US 2012/0086392 A1    Apr. 12, 2012

(30) Foreign Application Priority Data

Oct. 6, 2010   (JP) .................................. 2010-226723

(51) Int. Cl.
*H02J 7/00*    (2006.01)
*G11C 5/14*    (2006.01)

(52) U.S. Cl.
CPC ............. *H02J 7/0052* (2013.01); *H02J 7/0029* (2013.01); *H02J 7/0068* (2013.01)

(58) Field of Classification Search
USPC ........................... 320/138, 160, 125; 365/229
See application file for complete search history.

(56) References Cited

U.S. PATENT DOCUMENTS

| | | | | |
|---|---|---|---|---|
| 5,532,676 | A * | 7/1996 | Moore, III | 327/545 |
| 5,719,816 | A * | 2/1998 | Ishikawa | 365/229 |
| 6,055,068 | A * | 4/2000 | Abe et al. | 358/468 |
| 7,684,723 | B2 * | 3/2010 | Kikuchi | 399/88 |
| 2009/0115369 | A1 * | 5/2009 | Lin et al. | 320/114 |
| 2013/0007342 | A1 * | 1/2013 | Inoue et al. | 711/102 |
| 2013/0257358 | A1 * | 10/2013 | Hussain et al. | 320/107 |

FOREIGN PATENT DOCUMENTS

| | | |
|---|---|---|
| CN | 101383436 A | 3/2009 |
| CN | 101409456 A | 4/2009 |
| JP | 08-129511 | 5/1996 |
| JP | 2002-247250 A | 8/2002 |

OTHER PUBLICATIONS

Office Action issued in Corresponding Japanese Patent Application No. 2010-226723 dated Jun. 24, 2014.
Notice on the First Office Action for corresponding CN 201110303349.9, dated Nov. 5, 2013. English translation provided.

* cited by examiner

*Primary Examiner* — Richard Isla Rodas
*Assistant Examiner* — David V Henze-Gongola
(74) *Attorney, Agent, or Firm* — Rossi, Kimms & McDowell LLP

(57) ABSTRACT

An information processing apparatus capable of suppressing a secondary battery from being charged with an amount of charge current that can apply excessive load on the secondary battery, without a backup power source function of the secondary battery being impaired. When determining that a predetermined type of data is stored in a DRAM to be backed up by the secondary battery, the information processing apparatus selects a first constant current circuit and quickly charges the secondary battery with a large charge current output from the first constant current circuit. When determining that the predetermined type of data is not stored in the DRAM, the information processing apparatus selects a second constant current circuit and normally charges the secondary battery with a small charge current output from the second constant current circuit.

7 Claims, 3 Drawing Sheets

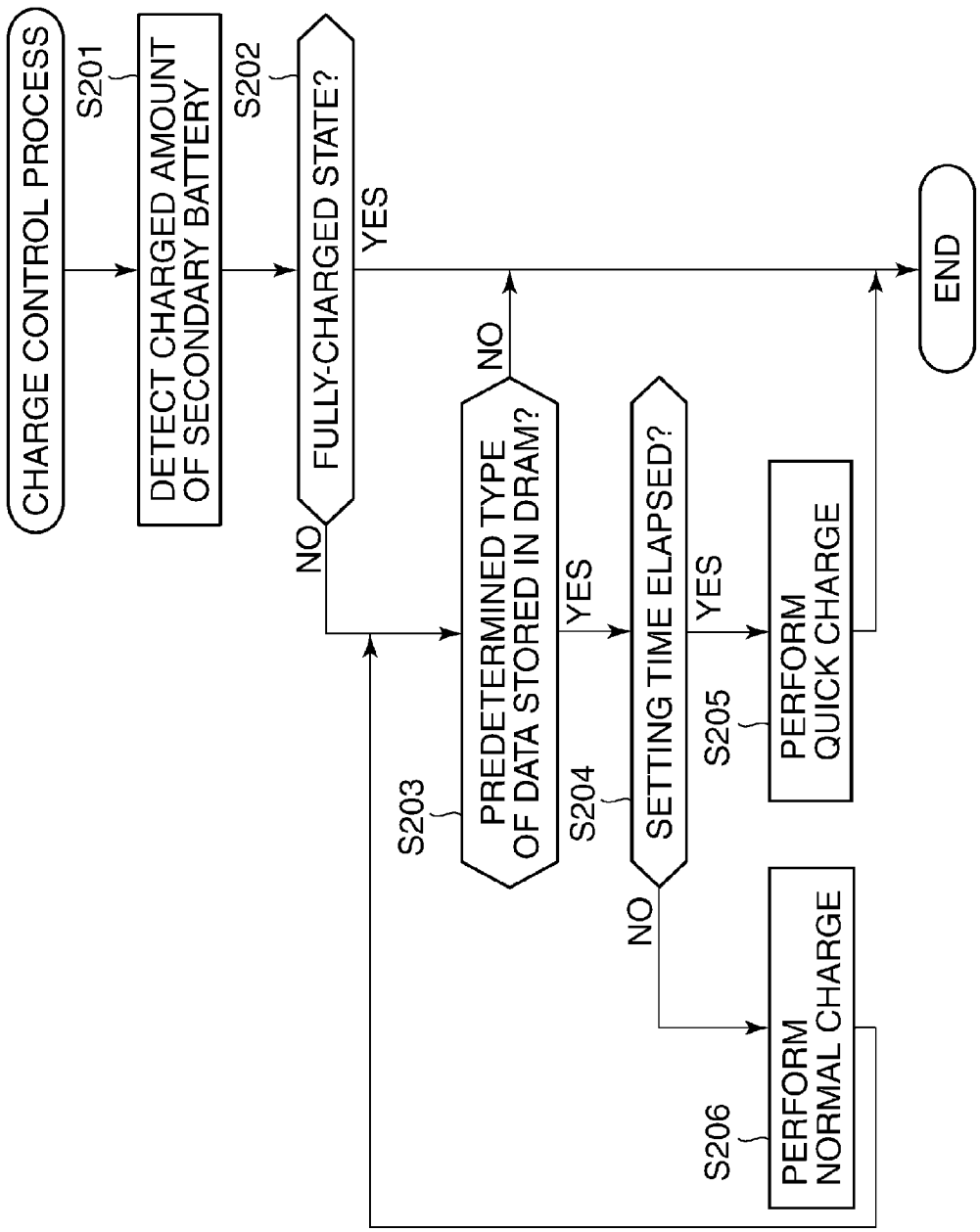

INFORMATION PROCESSING APPARATUS, AND CONTROL METHOD AND STORAGE MEDIUM THEREFOR

BACKGROUND OF THE INVENTION

1. Field of the Invention

The present invention relates to an information processing apparatus, a control method therefor, and a storage medium storing a program for executing the control method.

2. Description of the Related Art

A secondary battery such as a lithium battery or a nickel hydride battery is used as a temporary backup power source at shutdown of power supply from a power source. For example, an image processing apparatus has a secondary battery that supplies backup power enabling a volatile memory of the apparatus such as a DRAM to retain facsimile image data, etc. at shutdown of power supply from, e.g., a commercially available AC power source to the image processing apparatus.

Such a backup secondary battery is provided for accidental short-time power shutdown such as power outage, and is generally charged to become a predetermined charged state, e.g., a fully-charged state. However, if the fully-charged secondary battery is further charged to an overcharged state, the battery performance is deteriorated. Accordingly, techniques have been proposed in which when a fully-charged state of the secondary battery is detected, a shift is made to trickle charge where the battery is charged with an amount of current for compensating only for self-discharge of the battery.

In these techniques, when the battery voltage reaches a predetermined voltage, a fully-charged state is detected and a shift is made to the trickle charge. However, a relation between battery voltage and battery charge state varies depending on peripheral temperature, and accordingly, a fully-charged state cannot be properly detected in some cases without using a temperature sensor. Thus, there has been proposed a technique for starting normal charge at power-on and for making a changeover from normal charge to trickle charge when a predetermined time period (e.g., 12 hours to 16 hours) has lapsed from the start of the normal charge.

Another proposed technique is to reduce power consumption by not performing data backup at shutdown of power supply or at power-saving in a case where there is no backup object data such as facsimile image data (see, for example, Japanese Laid-open No. H08-129511).

However, it takes several hours for the secondary battery to be charged by the normal charge to a fully-charged state. Accordingly, if an image processing apparatus or the like is started up in a state where the secondary battery is almost discharged, a time period over which a data backup operation can be performed becomes extremely short immediately after the start of the apparatus, so that the backup power source function of the secondary battery is impaired.

Also known is quick charge in which an amount of charge current is increased as compared to that in the normal charge to thereby shorten a time period required for battery charge. However, there is a fear that overcharge is caused, if the quick charge using a large amount of charge current per unit time is performed in a state where the battery charge state cannot be detected with accuracy due to a change in peripheral temperature.

SUMMARY OF THE INVENTION

The present invention provides an information processing apparatus capable of suppressing a secondary battery from being charged with an amount of charge current that can apply excessive load on the secondary battery, without a backup power source function of the secondary battery being impaired, and provides a control method and a storage medium for the information processing apparatus.

According to one aspect of this invention, there is provided an information processing apparatus, which comprises a volatile storage unit, a first supply unit configured to supply electric power to the storage unit, a second supply unit configured to supply electric power to the storage unit in a case where the first supply unit becomes unable to supply electric power to the storage unit, a charging unit configured to charge the supply unit by a first charging method or by a second charging method capable of charging more quickly than the first charging method, and a control unit configured to perform control such that the charging unit charges the second supply unit by the first charging method in a case where there is no predetermined data in the storage unit and such that the charging unit charges the second supply unit by the second charging method in a case where there is the predetermined data in the storage unit.

With this invention, it is possible to suppress a secondary battery from being charged with an amount of charge current that can apply excessive load on the secondary battery, without a backup power source function of the secondary battery being impaired.

Further features of the present invention will become apparent from the following description of an exemplary embodiment with reference to the attached drawings.

BRIEF DESCRIPTION OF THE DRAWINGS

FIG. 3 is a flowchart showing procedures of another charge control process executed by the CPU of the battery charger.

DESCRIPTION OF THE EMBODIMENTS

The present invention will now be described in detail below with reference to the drawings showing a preferred embodiment thereof.

Figure 1:
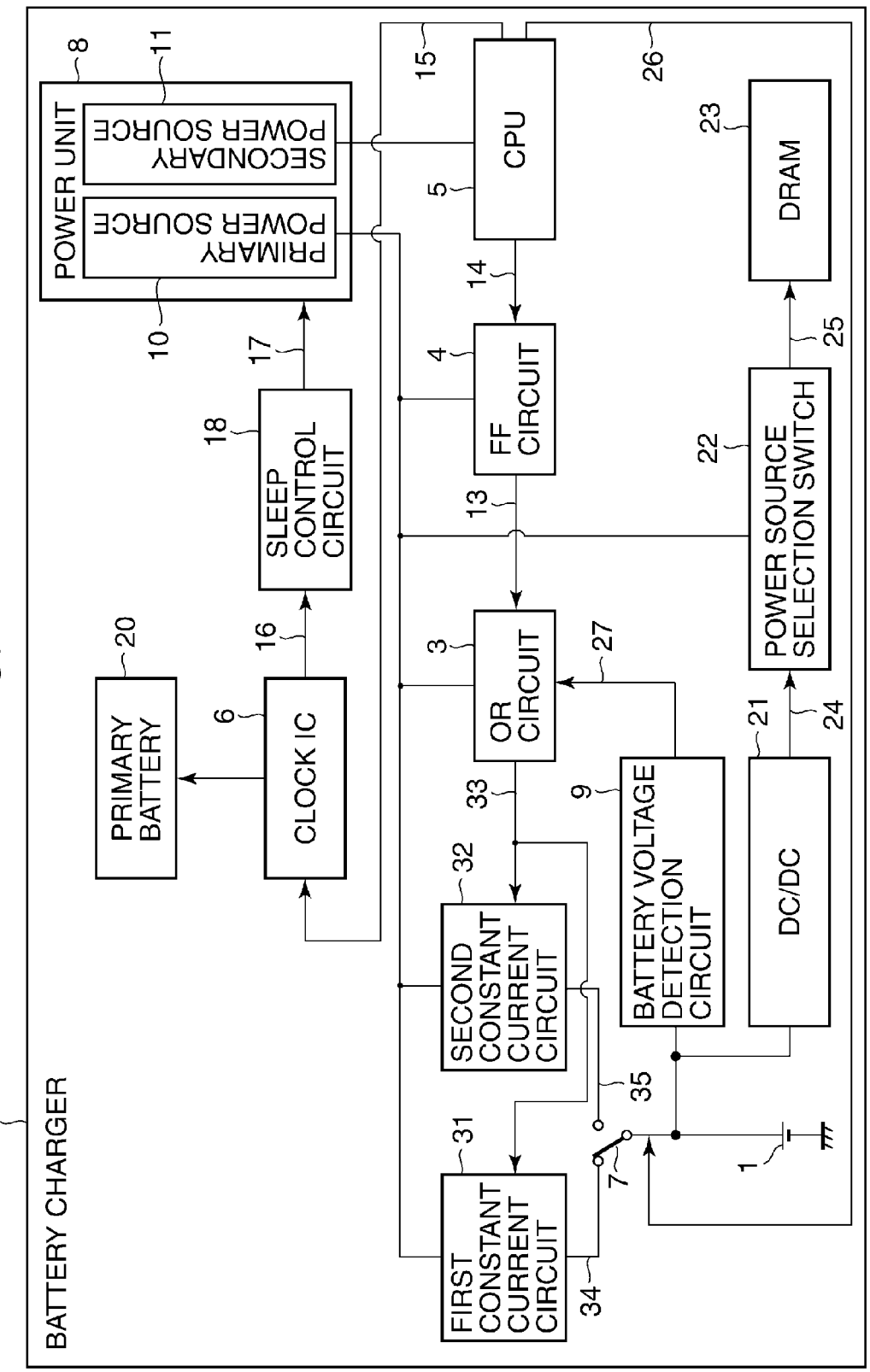
FIG. 1 is a block diagram schematically showing the construction of a battery charger, which is an information processing apparatus according to one embodiment of this invention.

FIG. 1 schematically shows in block diagram the construction of a battery charger, which is an information processing apparatus according to one embodiment of this invention.

In FIG. 1, reference numeral 100 denotes a battery charger. The battery charger 100 of this embodiment is configured to charge a secondary battery 1 (second supply unit) serving as a backup power source for a DRAM 23 (volatile storage unit) for use by an image processing apparatus (not shown) to store image data, for example. It should be noted that this invention is not limited to this embodiment, but is applicable to any battery charger (information processing apparatus) for charging a secondary battery serving as a backup power source for a volatile memory.

The battery charger 100 includes a CPU 5, clock IC 6, primary battery 20, sleep control circuit 18, and power unit 8.

The power unit 8 is connected to an AC power source (not shown), and generates, from AC power supplied from the AC power source, DC power to be supplied to the battery charger 100 and to the image processing apparatus mounted with the battery charger 100. The power unit 8 includes a primary power source 10 that outputs the DC power as long as the AC power is supplied from the AC power source, and a secondary power source 11 that stops outputting the DC power when the image processing apparatus is in a sleep state.

The CPU 5 is supplied with the power from the secondary power source 11. Since the power consumption of the CPU 5 is relatively large, the power supply to the CPU 5 is stopped in this embodiment when the image processing apparatus is in the sleep state.

The CPU 5 is connected through a bus (not shown) to a ROM (not shown) and to the DRAM 23, and controls operations of various parts of the battery charger 100 by executing a program read from the ROM. The CPU 5 outputs to the clock IC 6 interface signals 15 according to which the clock IC 6 is set and clock information is read from the clock IC 6.

The clock IC 6 is supplied with power from a primary battery 20 such as a dry battery or a lithium battery, and is operable unless the primary battery 20 is exhausted, even if the AC power supply from the AC power source is shut down. The clock IC 6 outputs an interrupt output 16 to the sleep control circuit 18 when an alarm time set beforehand in the clock IC 6 by the CPU 5 is reached.

The sleep control circuit 18 is supplied with power from the primary power source 10 of the power unit 8. If the interrupt output 16 is output from the clock IC 6 when the power unit 8 is in a sleep state, the sleep control circuit 18 outputs a wakeup signal 17 to cause the power unit 8 to wake up from the sleep state.

The battery charger 100 further includes first and second constant current circuits 31, 32, charge current selection switch 7, battery voltage detection circuit 9, OR circuit 3, DC/DC converter 21, power source selection switch 22, and flip-flop circuit (hereinafter, referred to as the FF circuit) 4.

The CPU 5 outputs a charge/non-charge signal 14 to the FF circuit 4.

The FF circuit 4 outputs to the OR circuit 3 an FF signal 13 which is set according to the charge signal 14 from the CPU 5 and reset according to the non-charge signal 14 from the CPU 5.

The battery voltage detection circuit 9 mainly includes a comparator, and detects a voltage across the secondary battery 1. When detecting a secondary battery voltage less than a voltage at which the secondary battery 1 is regarded as being in a fully-charged state, the battery voltage detection circuit 9 outputs a non-full charge detection signal 27 to the OR circuit 3.

The OR circuit 3 outputs to the first and second constant current circuits 31, 32 an OR output of the non-full detection signal 27 from the battery voltage detection circuit 9 and the FF signal 13 from the FF circuit 4. The OR circuit 3 is supplied with power from the primary power source 10.

The first and second constant current circuits 31, 32 are supplied with power from the primary power source 10. The first constant current circuit 31 is configured to output a first charge current 34 to be used to charge the secondary battery 1, and the second constant current circuit 32 is configured to output a second charge current 35 to be used to charge the secondary battery 1 and less than the first charge current 34. The constant current circuits 31, 32 are each mainly comprised of transistors, and the secondary battery 1 is a lithium ion battery or a nickel hydride battery.

The first and second constant current circuits 31, 32 are each supplied with the OR output 33 from the OR circuit 3. If the OR output 33 is at ON, the first and second constant current circuits 31, 32 output the first and second charge currents 34, 35, respectively. On the other hand, if the OR output 33 from the OR circuit 3 is at OFF, the constant current circuits 31, 32 stop outputting the charge currents.

The charge current selection switch 7 selects either the first constant current circuit 31 or the second constant current circuit 32 in accordance with a charge current selection signal 26 from the CPU 5. If the first constant current circuit 31 is selected by the selection switch 7 and if the OR output 33 is at ON, the secondary battery 1 is quickly charged with the large charge current 34 from the first constant current circuit 31. On the other hand, if the second constant current circuit 32 is selected by the selection switch 7 and if the OR output 33 is at ON, the secondary battery 1 is normally charged with the small charge current 35 from the second constant current circuit 32.

The DC/DC converter 21 generates backup power 24 from the output power of the secondary battery 1, and outputs the backup power 24 to the power source selection switch 22.

The power source selection switch 22 selects either the DC power from the primary power source 10 or the backup power 24 output from the DC/DC converter 21. If the power unit 8 is supplied with AC power from the AC power source, the power source selection switch 22 selects the DC power from the primary power source 10 (first supply unit), and outputs the DC power as power 25 to the DRAM 23. On the other hand, if the AC power supply from the AC power source to the power unit 8 is shut down due to power outage or the like, the selection switch 22 selects the backup power 24 output from the DC/DC converter 21, and outputs the backup power 24 as the power 25 to the DRAM 23.

The DRAM 23 operates with the power 25 output from the power source selection switch 22, and is used by the CPU 5 to execute a program and to store image data. The DRAM 23 is backed up by the power of the secondary battery 1 and retains image data stored in the RAM 23 when the AC power supply to the power unit 8 is shut down. In other words, the secondary battery 1 serves as a backup power source for the DRAM 23.

Figure 2:
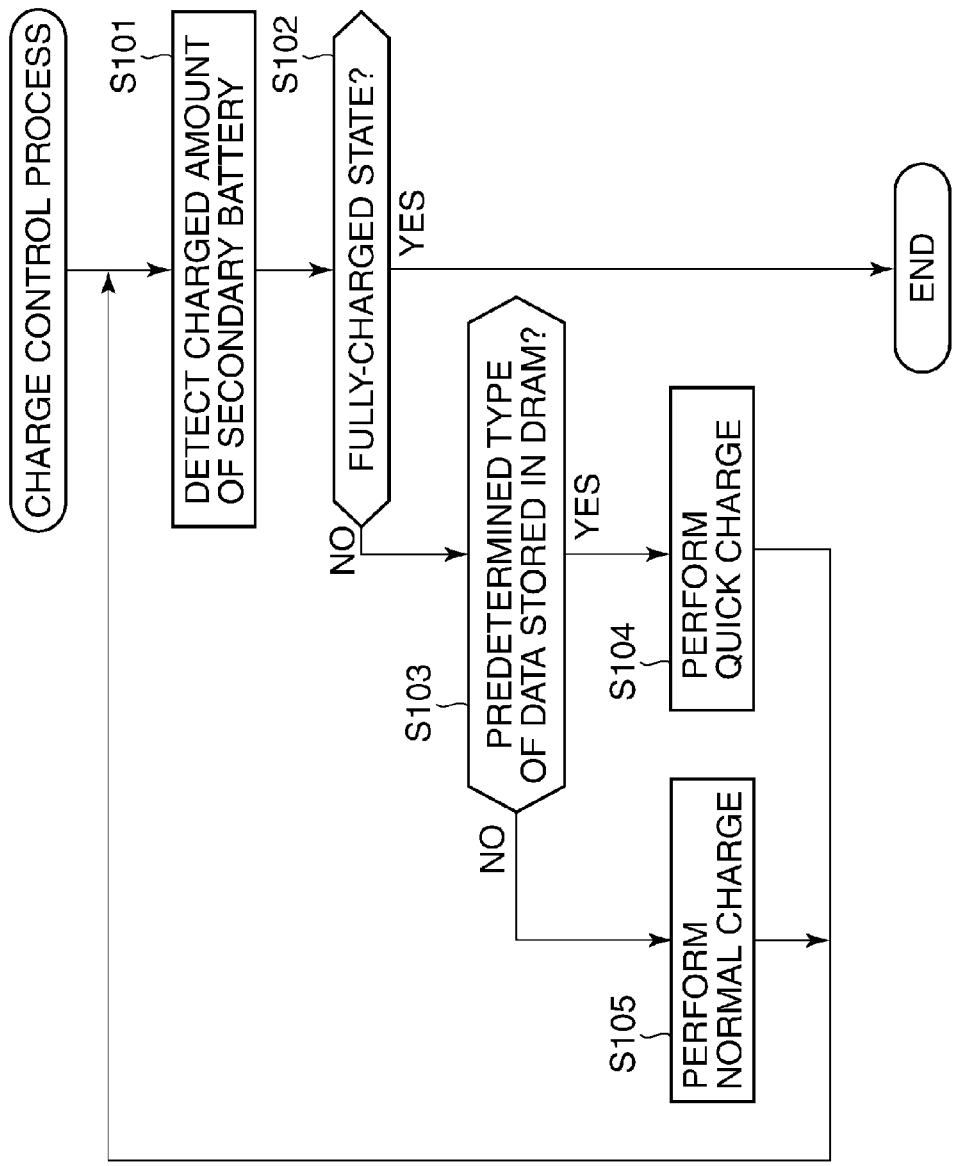
FIG. 2 is a flowchart showing procedures of a charge control process executed by a CPU of the battery charger.

FIG. 2 shows in flowchart the procedures of a charge control process executed by the CPU 5 of the battery charger 100.

In the charge control process of FIG. 2, the CPU 5 (control unit) detects a charged amount of the secondary battery 1 based on a secondary battery voltage detected by the battery voltage detection circuit 9 (step S101), and determines whether the charged amount of the secondary battery 1 is equal to or larger than a predetermined charged amount (step S102). In this embodiment, whether or not the secondary battery 1 is in a fully-charged state is determined in step S102. It should be noted that the predetermined charged amount is not limited to the charged amount that corresponds to the fully-charged state. For example, the predetermined charged amount can be equal to 90% of the charged amount corresponding to the fully-charged state. This also applies to a predetermined charged amount for use in a determination in step S202 of FIG. 3 described later.

If it is determined in step S102 that the secondary battery 1 is in the fully-charged state (i.e., if YES to step S102), the charge control process is completed. In that case, the FF signal 13 of the FF circuit 4 is reset according to the non-charge signal 14 from the CPU 5 and the non-full charge detection signal 27 is not output from the battery voltage detection circuit 9 (see FIG. 1). As a result, the OR output 33 from the OR circuit 3 becomes OFF, so that the first and second constant current circuits 31, 32 (charging unit) stop outputting the charge currents.

If it is determined in step S102 that the secondary battery 1 is not in the fully-charged state (i.e., if NO to step S102), whether a predetermined type of data (described later) is stored in the DRAM 23 is determined (step S103). If it is determined that such data is stored in the DRAM 23 (i.e., if YES to step S103), the first constant current circuit 31 is selected by the charge current selection switch 7, thereby performing the quick charge (step S104). In the quick charge, the secondary battery 1 is charged with the first charge current 34 (e.g., of 1 A) output from the first constant current circuit 31. Specifically, according to the non-full detection signal 27 from the battery voltage detection circuit 9, the OR output 33 from the OR circuit 3 becomes ON, so that the first and second charge currents 34, 35 are respectively output from the first and second constant current circuits 31, 32 and the secondary battery 1 is charged with the first charge current 34 from the first constant current circuit 31 selected by the selection switch 7 according to the charge current selection signal 26 from the CPU 5 (see FIG. 1).

On the other hand, if it is determined that the predetermined type of data is not stored in the DRAM 23 (i.e., if NO to step S103), the second constant current circuit 32 is selected by the charge current selection switch 7, thereby performing the normal charge (step S105). In the normal charge, the secondary battery 1 is charged with the second charge current 35 (e.g., of 200 mA) output from the second constant current circuit 32. Specifically, according to the non-full detection signal 27 from the battery voltage detection circuit 9, the OR output 33 from the OR circuit 3 becomes ON, so that the charge currents 34, 35 are respectively output from the constant current circuits 31, 32 and the secondary battery 1 is charged with the charge current 35 from the constant current circuit 32 selected by the selection switch 7 according to the charge current selection signal 26 from the CPU 5 (see FIG. 1).

The battery charger 100 of this embodiment is configured to charge the secondary battery 1 serving as the backup power source for the DRAM 23 mounted to the image processing apparatus. The predetermined type of data is, e.g., image data received in a reception job such as confidential fax reception or memory reception, or image data printed in a PDL print job, or image data transmitted in a transmission job such as scheduled FAX, SMB, E-mail, and I-FAX. In other words, the predetermined type of data is data to be printed on a recording medium or data to be transmitted and received between an apparatus mounted with the battery charger and other apparatus.

As described above, according to the charge control process of FIG. 2, the secondary battery 1 is normally charged with the predetermined charge current, i.e., with predetermined amount of power (more generally, the secondary battery 1 is charged by a first charging method) when the predetermined type of data (more generally, predetermined data) is not stored in the DRAM 23, but quickly charged with an amount of power larger than the predetermined amount of power (more generally, charged by a second charging method) when the predetermined type of data is stored in the DRAM 23. It is therefore possible to suppress the secondary battery 1 from being charged with an amount of current that can apply excessive load on the secondary battery 1, without impairing the backup power source function of the secondary battery 1.

Since the secondary battery 1 is suppressed from being overcharged by limitedly performing the quick charge, the secondary battery charge control can be realized by using a relatively low-priced circuit construction such as the battery voltage detection circuit 9 comprised of a comparator and the like.

FIG. 3 shows in flowchart the procedures of another charge control process executed by the CPU 5 of the battery charger 100.

In steps S201 to S203 of the charge control process of FIG. 3, the same processing as that in steps S101 to S103 in FIG. 2 is carried out. Specifically, the CPU 5 detects a charged amount of the secondary battery 1 based on a voltage detected by the battery voltage detection circuit 9 (step S201), and determines whether the secondary battery 1 is in the fully-charged state (step S202). If the secondary battery 1 is in the fully-charged state, the charge control process is completed.

On the other hand, if it is determined in step S202 that the secondary battery 1 is not in the fully-charged state, whether or not the predetermined type of data is stored in the DRAM 23 is determined (step S203). If it is determined that such data is not stored in the DRAM 23, the charge control process is completed.

If it is determined in step S203 that the predetermined type of data is stored in the DRAM 23 (i.e., if YES to step S203), the CPU 5 determines whether a setting time has elapsed from the start of charging, while referring to a built-in timer (step S204). The setting time is set to a time period required for the secondary battery 1 to be charged to a charge state where a required data backup operation time is ensured. If the setting time has elapsed from the start of charging (i.e., if YES to step S204), the CPU 5 outputs the charge current selection signal 26 according to which the selection switch 7 operates to select the second constant current circuit 32, thereby performing the normal charge (step S205). Then, the charge control process is completed.

On the other hand, if it is determined in step S204 that the setting time has not elapsed from the start of charging (i.e., if NO to step S204), the CPU 5 outputs the charge current selection signal 26 according to which the selection switch 7 operates to select the first constant current circuit 31, thereby performing the quick charge (step S206), whereupon the process returns to step S203.

As described above, according to the charge control process of FIG. 3, the secondary battery 1 is normally charged with the predetermined amount of power, if the predetermined type of data is stored in the DRAM 23 and if the predetermined time period has elapsed from the start of charging. On the other hand, the secondary battery 1 is quickly charged with the amount of power larger than the predetermined amount of power, if the predetermined type of data is stored in the DRAM 23 and if the predetermined time period has not elapsed from the start of charging. It is therefore possible to suppress the secondary battery 1 from being charged with an amount of current that can apply excessive load on the secondary battery 1, without impairing the backup power source function of the secondary battery 1.

In addition, with the charge control process of FIG. 3, since the quick charge is performed until the setting time has elapsed from the start of charging, it is possible to ensure the required data backup operation time by using a relatively low-priced circuit construction such as the battery voltage detection circuit 9 comprised of a comparator and the like, without causing the secondary battery 1 to be overcharged.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2010-226723, filed Oct. 6, 2010, which is hereby incorporated by reference herein in its entirety.

What is claimed is:

1. An information processing apparatus comprising:
    a volatile storage unit;
    a first supply unit configured to supply electric power to said storage unit;
    a second supply unit configured to supply electric power to said storage unit in a case where said first supply unit becomes unable to supply electric power to said storage unit;
    a charging unit configured to charge said second supply unit by a first charging method or by a second charging method capable of charging more quickly than the first charging method; and
    a control unit configured to perform control such that said charging unit charges said second supply unit by the first charging method when no FAX data is stored in said storage unit and such that said charging unit charges said second supply unit by the second charging method when the FAX data is stored in said storage unit;
    wherein the first charging method and the second charging method are mutually exclusive.

2. The information processing apparatus according to claim 1, wherein said control unit performs control such that said charging unit charges said second supply unit in a case where a charged amount of said second supply unit is less than a predetermined amount.

3. The information processing apparatus according to claim 1, wherein said control unit performs control such that said charging unit does not charge said second supply unit in a case where a charged amount of said second supply unit is greater than a predetermined amount.

4. The information processing apparatus according to claim 1, wherein said control unit performs control such that said charging unit charges said second supply unit by the second charging method until a predetermined time period has elapsed from start of charging in a case where FAX data is stored in said storage unit.

5. The information processing apparatus according to claim 1, wherein said control unit performs control such that said charging unit charges said second supply unit by the first charging method after a predetermined time period has elapsed from start of charging in a case where FAX data is stored in said storage unit.

6. A control method for an information processing apparatus having a volatile storage unit, a first supply unit for supplying electric power to the storage unit, a second supply unit for supplying electric power to the storage unit in a case where the first supply unit becomes unable to supply electric power to the storage unit, and a charging unit for charging the second supply unit by a first charging method or by a second charging method capable of charging more quickly than the first charging method, comprising:
    performing control such that the charging unit charges the second supply unit by the first charging method when no FAX data is stored in the storage unit; and
    performing control such that the charging unit charges the second supply unit by the second charging method when the FAX data is stored in the storage unit;
    wherein the first charging method and the second charging method are mutually exclusive.

7. A non-transitory computer-readable storage medium storing a program for causing a computer to execute a control method for an information processing apparatus having a volatile storage unit, a first supply unit for supplying electric power to the storage unit, a second supply unit for supplying electric power to the second storage unit in a case where the first supply unit becomes unable to supply electric power to the storage unit, and a charging unit for charging the supply unit by a first charging method or by a second charging method capable of charging more quickly than the first charging method, comprising:
    performing control such that the charging unit charges the second supply unit by the first charging method when no FAX data is stored in the storage unit; and
    performing control such that the charging unit charges the second supply unit by the second charging method when the FAX data is stored in the storage unit;
    wherein the first charging method and the second charging method are mutually exclusive.

* * * * *